US009862818B2

(12) United States Patent
Nakazawa et al.

(10) Patent No.: US 9,862,818 B2
(45) Date of Patent: Jan. 9, 2018

(54) ETHYLENE-VINYL ALCOHOL RESIN COMPOSITION, MULTILAYER SHEET, PACKAGING MATERIAL, AND CONTAINER

(71) Applicant: KURARAY CO., LTD., Kurashiki-shi (JP)

(72) Inventors: Shogo Nakazawa, Kurashiki (JP); Hiroshi Kawai, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 462 days.

(21) Appl. No.: 14/407,595

(22) PCT Filed: Jun. 12, 2013

(86) PCT No.: PCT/JP2013/066278
§ 371 (c)(1),
(2) Date: Dec. 12, 2014

(87) PCT Pub. No.: WO2013/187455
PCT Pub. Date: Dec. 19, 2013

(65) Prior Publication Data
US 2015/0152256 A1 Jun. 4, 2015

(30) Foreign Application Priority Data
Jun. 13, 2012 (JP) ................... 2012-134298

(51) Int. Cl.
B32B 27/08 (2006.01)
C08L 29/04 (2006.01)
B32B 27/30 (2006.01)
B32B 27/32 (2006.01)
C08L 23/08 (2006.01)
B32B 1/02 (2006.01)
B32B 27/34 (2006.01)
B32B 27/42 (2006.01)

(52) U.S. Cl.
CPC ............... C08L 29/04 (2013.01); B32B 1/02 (2013.01); B32B 27/08 (2013.01); B32B 27/306 (2013.01); B32B 27/32 (2013.01); B32B 27/34 (2013.01); B32B 27/42 (2013.01); C08L 23/0861 (2013.01); B32B 2250/02 (2013.01); B32B 2307/7244 (2013.01); B32B 2439/00 (2013.01); C08L 2205/025 (2013.01); Y10T 428/1352 (2015.01); Y10T 428/31855 (2015.04)

(58) Field of Classification Search
CPC .... C08L 29/04; C08L 23/0861; B32B 27/306; B32B 27/42; C08K 5/07; C08K 3/32; C08K 3/38; C08K 5/09; C08K 5/55; C08K 2003/329; C08K 2003/321
USPC ............... 524/459, 503, 557, 803; 526/330; 525/56, 62
See application file for complete search history.

(56) References Cited

U.S. PATENT DOCUMENTS

| 6,372,359 | B1* | 4/2002 | Hayashi ............... C08L 23/08 428/515 |
|---|---|---|---|
| 2004/0013893 | A1 | 1/2004 | Nakaya et al. |
| 2006/0047040 | A1 | 3/2006 | Shida et al. |
| 2007/0196679 | A1 | 8/2007 | Moriyama et al. |
| 2008/0281045 | A1 | 11/2008 | Zhang |
| 2015/0041462 | A1 | 2/2015 | Nakazawa et al. |

FOREIGN PATENT DOCUMENTS

| CN | 1251808 A | 5/2000 |
|---|---|---|
| CN | 101006130 A | 7/2007 |
| CN | 101027356 A | 8/2007 |
| CN | 101679706 A | 3/2010 |
| JP | 55-157641 A | 12/1980 |
| JP | 6-23924 A | 2/1994 |
| JP | 6-293848 A | 10/1994 |
| JP | 8-239528 A | 9/1996 |
| JP | 9-71620 A | 3/1997 |
| JP | 2000-212369 A | 8/2000 |
| JP | 2001-31821 A | 2/2001 |
| JP | 2001-277341 A | 10/2001 |
| JP | 2003-205582 A | 7/2003 |
| JP | 2004-43022 A | 2/2004 |
| JP | 2005-41993 A | 2/2005 |
| JP | 2006-124668 A | 5/2006 |

(Continued)

OTHER PUBLICATIONS

Machine Translation of JP 2006-272569.*
Machine Translation of JP 2007-031725.*
Extended European Search Report dated Dec. 22, 2015 in Patent Application No. 13804468.0.
U.S. Appl. No. 14/407,136, filed Dec. 11, 2014, Nakazawa, et al.
U.S. Appl. No. 14/382,459, filed Sep. 2, 2014, Nakazawa, et al.
International Search Report dated Sep. 10, 2013 in PCT/JP2013/066278.

Primary Examiner — Maria Veronica Ewald
Assistant Examiner — Zachary Davis
(74) Attorney, Agent, or Firm — Oblon, McClelland, Maier & Neustadt, L.L.P.

(57) ABSTRACT

The present invention provides a resin composition containing: (A) an ethylene-vinyl alcohol copolymer having an ethylene content of 20 mol % or more and 50 mol % or less; (B) an ethylene-vinyl alcohol copolymer having an ethylene content of 30 mol % or more and 60 mol % or less; and (C) an unsaturated aldehyde, a value obtained by subtracting the ethylene content of the ethylene-vinyl alcohol copolymer (A) from the ethylene content of the ethylene-vinyl alcohol copolymer (B) being 8 mol % or more, a mass ratio (A/B) of the ethylene-vinyl alcohol copolymer (A) to the ethylene-vinyl alcohol copolymer (B) being 60/40 or more and 95/5 or less, and the content of the unsaturated aldehyde (C) with respect to a resin content being 0.01 ppm or more and less than 100 ppm.

9 Claims, No Drawings

(56) References Cited

FOREIGN PATENT DOCUMENTS

| JP | 2006-272569 | A |   | 10/2006 |
|----|-------------|---|---|---------|
| JP | 2006272569  | A | * | 10/2006 |
| JP | 2007-31725  | A |   | 2/2007  |
| JP | 2007031725  | A | * | 2/2007  |
| JP | 209-242645  | A |   | 10/2009 |
| WO | WO 03/072653 | A1 |  | 9/2003  |
| WO | WO 2006/022256 | A1 | | 3/2006 |

* cited by examiner

ETHYLENE-VINYL ALCOHOL RESIN COMPOSITION, MULTILAYER SHEET, PACKAGING MATERIAL, AND CONTAINER

TECHNICAL FIELD

The present invention relates to a resin composition, a multilayer sheet, a packaging material and a container.

BACKGROUND ART

Ethylene-vinyl alcohol copolymers (hereinafter, may be abbreviated as "EVOH(s)") are useful polymeric materials that are superior in barrier properties against various types of gases such as oxygen, oil resistance, antistatic properties, mechanical strength and the like; therefore, EVOHs have been molded into films, sheets, containers, packaging materials and the like, and widely used as various types of packaging materials. However, the EVOH has a large number of hydroxyl groups in its molecule, and has high crystallinity, a great velocity of crystallization and poor flexibility; therefore, the EVOH has disadvantages that: the EVOH exhibits poor suitability for secondary processing, in particular, heat stretching properties when being molded into packaging materials for foods and the like, leading to the generation of cracks in the molding, and in turn, to a decrease of a process yield of products; and a reduction of mechanical strength due to a thickness variation and/or deterioration of gas barrier properties occur(s), leading to lack of quality stability.

In order to improve the suitability for secondary processing, blending various types of elastomers such as an ethylene-vinyl acetate copolymer (EVA) into the EVOH has been proposed. However, these elastomers have a disadvantage that they have poor compatibility with the EVOH and therefore the resultant composition may have reduced transparency.

In view of such drawbacks, as a method for improving the transparency while ensuring the suitability for secondary processing, a process including blending EVOHs each having a different ethylene content has been developed. Specifically investigated examples include the following: a resin composition that contains two types of saponified ethylene-vinyl acetate copolymers, one having a degree of saponification of 95 mol % or more and the other having a degree of saponification of 70 mol % or more, and a polyamide resin in which a terminal carboxyl group is adjusted (see Japanese Unexamined Patent Application, Publication No. H8-239528); a resin composition that contains EVOH having a degree of saponification of 98 mol % or more, and EVOH having a reduced degree of saponification through reacetylation (see Japanese Unexamined Patent Application, Publication No. 2000-212369); and a resin composition that contains three types of EVOHs each having a different ethylene content (see Japanese Unexamined Patent Application, Publication No. 2001-31821).

However, according to the aforementioned conventional technologies, the transparency and the heat stretching properties are improved, but due to the use of the polyamide resin or the reacetylated EVOH, they have disadvantages that: a property for operation for a long time period (long-run workability) is poor; the generation of gels and seeds (dirt under paint) is increased in a long-run operation; and the like. In addition, in such a method involving using different EVOHs, flow marks, which are not typically generated in a single-EVOH system, are generated, and in particular significantly generated in a long-run operation. The flow marks are generated when the difference of viscosity is caused between two types of EVOHs in an operation for a long time period, leading to an unstable flow that occurs at a front part of the flow ("flow front" as generally referred to), in the melt molding. These flow marks as well as coloring are causes for unfavorable appearance in the resultant products.

PRIOR ART DOCUMENTS

Patent Documents

Patent Document 1: Japanese Unexamined Patent Application, Publication No. H8-239528
Patent Document 2: Japanese Unexamined Patent Application, Publication No. 2000-212369
Patent Document 3: Japanese Unexamined Patent Application, Publication No. 2001-31821

SUMMARY OF THE INVENTION

Problems to be Solved by the Invention

The present invention was made in view of the foregoing circumstances, and an object of the invention is to provide a resin composition that exhibits inhibited flowmarks and coloring in a long-run operation, and is superior in heat stretching properties.

Means for Solving the Problems

According to an aspect of the invention made for solving the aforementioned problems, a resin composition contains (A) an ethylene-vinyl alcohol copolymer having an ethylene content of 20 mol % or more and 50 mol % or less; (B) an ethylene-vinyl alcohol copolymer having an ethylene content of 30 mol % or more and 60 mol % or less; and (C) an unsaturated aldehyde, a value obtained by subtracting the ethylene content of the ethylene-vinyl alcohol copolymer (A) from the ethylene content of the ethylene-vinyl alcohol copolymer (B) being 8 mol % or more, a mass ratio (A/B) of the ethylene-vinyl alcohol copolymer (A) to the ethylene-vinyl alcohol copolymer (B) being 60/40 or more and 95/5 or less, and a content of the unsaturated aldehyde (C) with respect to a resin content being 0.01 ppm or more and less than 100 ppm.

Due to containing two types of EVOHs each having the specified range of the ethylene content and the unsaturated aldehyde (C) in each specified amount, the resin composition according to the aspect of the present invention exhibits inhibited flow marks and coloring in a long-run operation, and is superior in heat stretching properties. In regard to the reason why the resin composition achieves the effects described above, it is presumed, for example, that the heat stretching properties are improved due to containing the two types of EVOHs, and incorporating thereinto the unsaturated aldehyde (C) in an adequate amount falling within the aforementioned range enables the flow marks to be inhibited through the effects of crosslinking and the like.

The difference between the melting point of the ethylene-vinyl alcohol copolymer (A) and the melting point of the ethylene-vinyl alcohol copolymer (B) is preferably 15° C. or more.

The resin composition exhibits improved heat stretching properties when the melting points of the two types of EVOHs show the difference described above.

The ethylene-vinyl alcohol copolymer (B) preferably has a structural unit represented by the following formula (1), and a percentage content of the structural unit with respect to the total vinyl alcohol units is preferably 0.3 mol % or more and 40 mol % or less.

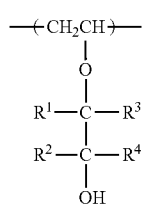

In the formula (1), $R^1$, $R^2$, $R^3$ and $R^4$ each independently represent a hydrogen atom, a hydrocarbon group having 1 to 10 carbon atoms or an alkoxy group having 1 to 10 carbon atoms, in which a part or all of hydrogen atoms included in the hydrocarbon group are unsubstituted or optionally substituted with a hydroxyl group, an alkoxy group, a carboxyl group or a halogen atom, and $R^1$ and $R^2$ optionally represent a ring structure through binding with each other.

Due to the ethylene-vinyl alcohol copolymer (B) having the specified structural unit, the resin composition exhibits further improved heat stretching properties.

The unsaturated aldehyde (C) may be an unsaturated aliphatic aldehyde, or at least one selected from the group consisting of crotonaldehyde, 2,4-hexadienal and 2,4,6-octatrienal. Due to containing the above-specified aldehyde as the unsaturated aldehyde (C), the resin composition can exhibit further inhibited flow marks and coloring in the long-run operation mentioned above, and is more superior in heat stretching properties.

According to another aspect of the present invention, a multilayer sheet includes:

a barrier layer formed from the resin composition according to the aspect of the present invention; and a thermoplastic resin layer laminated on at least one face of the barrier layer.

Due to including the barrier layer formed from the resin composition having the aforementioned characteristics, and the thermoplastic resin layer, the multilayer sheet exhibits superior appearance characteristics and heat stretching properties.

According to the multilayer sheet, the barrier layer and the thermoplastic resin layer are preferably laminated using a coextrusion molding process.

Due to the two types of layers being laminated using the coextrusion molding process, the multilayer sheet can be easily and reliably produced, and as a result, the superior appearance characteristics and heat stretching properties described above can be effectively achieved.

According to still another aspect of the present invention, a packaging material is obtained through molding of the multilayer sheet according to the another aspect of the present invention using a heat-stretching process.

Since the packaging material is formed using the aforementioned multilayer sheet, through the specified molding process, the packaging material can be easily and reliably produced, and exhibits superior appearance characteristics and inhibited flow marks.

Moreover, according to yet still another aspect of the present invention, a container is obtained through molding of the multilayer sheet according to the another aspect of the present invention using a vacuum-pressure forming process.

Since the container is formed using the aforementioned multilayer sheet, through the specified molding process, the container can be easily and reliably produced, and exhibits superior appearance characteristics and inhibited flow marks, and moreover in the container, the continuity of the resin composition layer is maintained, resulting in superior gas barrier properties.

Effects of the Invention

As explained in the foregoing, the resin composition according to the aspect of the present invention exhibits inhibited flow marks and coloring in a long-run operation and is superior in heat stretching properties; therefore, the resin composition enables molded articles exhibiting superior appearance characteristics and inhibited flowmarks to be molded. The multilayer sheet according to the another aspect of the present invention exhibits superior appearance characteristics and heat stretching properties. The packaging material according to the still another aspect of the present invention exhibits superior appearance characteristics and inhibited flow marks. The container according to the yet still another aspect of the present invention exhibits superior appearance characteristics and superior flow mark characteristics, and moreover in the container, the continuity of the resin composition layer is maintained, resulting in superior gas barrier properties. Therefore, the resin composition, the multilayer sheet, the packaging material and the container can be suitably used as a packaging material and the like superior in appearance characteristics, suitability for secondary processing, mechanical strength and the like.

DESCRIPTION OF EMBODIMENTS

Hereinafter, preferred embodiments for carrying out the present invention will be explained, but the present invention is not limited thereto. Moreover, unless otherwise specified particularly, materials illustrated may be used either alone, or two or more types thereof may be used in combination.

Resin Composition

A resin composition according to an embodiment of the present invention contains two types of EVOHs, (A) EVOH and (B) EVOH, each having a different ethylene content, and (C) an unsaturated aldehyde, the value obtained by subtracting the ethylene content of the EVOH (A) from the ethylene content of the EVOH (B) being 8 mol % or more, the mass ratio (A/B) of the EVOH (A) to the EVOH (B) being 60/40 or more and 95/5 or less, and the content of the unsaturated aldehyde (C) with respect to a resin content being 0.01 ppm or more and less than 100 ppm.

It is to be noted that the "resin content" means the total resin components including the EVOH (A) and the EVOH (B) as well as other resin which may be contained as an optional component described later.

In addition, the resin composition may contain an optional component such as a boron compound, a conjugated polyene compound, acetic acid and/or an acetic acid salt, and a phosphorus compound, within a range not leading to impairment of the effects of the present invention. Hereinafter, each component will be explained.

(A) EVOH

The EVOH (A) is an ethylene-vinyl alcohol copolymer obtained by saponifying an ethylene-vinyl ester copolymer.

The ethylene content of the EVOH (A) is 20 mol % or more and 50 mol % or less, preferably 24 mol % or more and 45 mol % or less, more preferably 27 mol % or more and 42 mol % or less, and still more preferably 27 mol % or more and 38 mol % or less. When the ethylene content is less than the lower limit, gelation of the resin composition becomes likely to occur due to decreased thermal stability in melt molding, and thus defects such as streaks and fish eyes are likely to occur. In particular, when the operation is carried out for a long time period under conditions involving a higher temperature or higher speed than that in conditions for general melt extrusion, gelation of the resin composition becomes remarkable. On the other hand, when the ethylene content is greater than the upper limit, the barrier properties against various types of gases of the resin composition may be deteriorated, and inherent characteristics of the EVOH may not be maintained.

The lower limit of the degree of saponification of a vinyl ester unit in the EVOH (A) is typically 85% or more, preferably 90 mol %, more preferably 95 mol %, still more preferably 98 mol %, and particularly preferably 99 mol %. When the degree of saponification is less than the lower limit, thermal stability of the resin composition may be insufficient.

A typical vinyl ester used for producing the EVOH (A) is exemplified by vinyl acetate; however, in addition thereto, other fatty acid vinyl ester such as vinyl propionate and vinyl pivalate may be used.

The EVOH (A) can be produced by polymerizing ethylene and the vinyl ester; however, in addition thereto, a vinylsilane compound may be further used as a copolymer component. The percentage content of a unit derived from the vinylsilane compound in the EVOH (A) with respect to the total structural units constituting the EVOH (A) is typically 0.0002 mol % to 0.2 mol %.

Examples of the vinylsilane compound include vinyltrimethoxysilane, vinyltriethoxysilane, vinyltri(β-methoxyethoxy)silane, γ-methacryloxypropylmethoxysilane, and the like. Of these, vinyltrimethoxysilane and vinyltriethoxysilane are preferred.

Furthermore, in the production of the EVOH (A), other monomer(s) except for ethylene, the vinyl ester and the vinylsilane compound may be used as a copolymer component, within a range not leading to impairment of the effects of the present invention.

Examples of the other monomer include:

unsaturated hydrocarbons such as propylene and butylene;

unsaturated carboxylic acids or esters thereof such as (meth)acrylic acid, methyl (meth)acrylate and ethyl (meth)acrylate;

vinylpyrrolidones such as N-vinylpyrrolidone; and the like.

(B) EVOH

The EVOH (B) is an ethylene-vinyl alcohol copolymer obtained by saponifying an ethylene-vinyl ester copolymer, similarly to the EVOH (A).

The ethylene content of the EVOH (B) is 30 mol % or more and 60 mol % or less, preferably 35 mol % or more and 55 mol % or less, and more preferably 38 mol % or more and 52 mol % or less. When the ethylene content is less than the lower limit, the effects of the resin composition in terms of flexibility, secondary processability and heat stretching properties may not be satisfactorily achieved. On the other hand, when the ethylene content is greater than the upper limit, the barrier properties against various types of gases of the resin composition may be deteriorated.

The lower limit of the degree of saponification of vinyl ester unit in the EVOH (B) is preferably 85 mol %, more preferably 90 mol %, still more preferably 95 mol %, and particularly preferably 99 mol %. In addition, the upper limit of the degree of saponification is preferably 99.99 mol %, more preferably 99.98 mol %, and still more preferably 99.95 mol %. When the degree of saponification of the EVOH (B) falls within the above range, the heat stretching properties of the resin composition can be further improved without deteriorating the thermal stability and the gas barrier properties. When the degree of saponification is less than the lower limit, the thermal stability of the resin composition may be insufficient. When the degree of saponification is greater than the upper limit, the time period required for the saponification may be increased, and thus, the productivity of the EVOH (B) may be deteriorated.

Besides, the type of the vinyl ester which may be used in the production as well as a copolymer component which may be used and the amount thereof are similar to those for the EVOH (A).

In light of an improvement of the flexibility, the secondary processing characteristics and the heat stretching properties of the resin composition, the EVOH (B) may be a modified ethylene-vinyl alcohol copolymer (hereinafter, may be abbreviated as "modified EVOH"). The modified EVOH is exemplified by EVOHs having a structural unit (I) represented by the following formula (1), and the like. The lower limit of the percentage content of the structural unit (I) with respect to the total vinyl alcohol units constituting the EVOH (B) is preferably 0.3 mol %, more preferably 0.5 mol %, still more preferably 1 mol %, and particularly preferably 1.5 mol %. On the other hand, the upper limit of the percentage content of the structural unit (I) is preferably 40 mol %, more preferably 20 mol %, still more preferably 15 mol %, and particularly preferably 10 mol %. It is to be noted that the vinyl alcohol unit constituting the EVOH as referred to means a structural unit represented by —CH$_2$CH(OH)— and a structural unit in which the hydrogen atom of the hydroxyl group of this structural unit is substituted with other group.

(1)

In the above formula (1), $R^1$, $R^2$, $R^3$ and $R^4$ each independently represent a hydrogen atom, a hydrocarbon group having 1 to 10 carbon atoms or an alkoxy group having 1 to 10 carbon atoms, in which a part or all of hydrogen atoms included in the hydrocarbon group are unsubstituted or optionally substituted with a hydroxyl group, an alkoxy group, a carboxyl group or a halogen atom, and $R^1$ and $R^2$ optionally represent a ring structure through binding with each other.

Although the method for producing the modified EVOH is not particularly limited, the method is exemplified by a method involving reacting the EVOH with an epoxy compound having a molecular weight of 500 or less to obtain the modified EVOH, and the like. The EVOH used as a basic material for the modified EVOH may be EVOH similar to the aforementioned EVOH.

The epoxy compound having a molecular weight of 500 or less is preferably an epoxy compound having 2 to 8 carbon atoms. In light of the ease of handling of the compound and the reactivity with the EVOH, an epoxy compound having 2 to 6 carbon atoms is more preferred, and an epoxy compound having 2 to 4 carbon atoms is still more preferred. Of these, the epoxy compound having a molecular weight of 500 or less is preferably 1,2-epoxybutane, 2,3-epoxybutane, epoxypropane, epoxyethane and glycidol, and more preferably epoxypropane and glycidol in light of the reactivity with the EVOH, and the gas barrier properties of the resultant EVOH (B).

The lower limit of a value obtained by subtracting the ethylene content of the EVOH (A) from the ethylene content of the EVOH (B) is 8 mol %, preferably 12 mol %, more preferably 15 mol %, and still more preferably 18 mol %. In addition, the upper limit of the aforementioned value is preferably 40 mol %, more preferably 30 mol %, and still more preferably 20 mol %. When the difference between the ethylene content of the EVOH (A) and the ethylene content of the EVOH (B) is less than the lower limit, the heat stretching properties of the resin composition may be insufficient. To the contrary, when the difference between the ethylene contents is greater than the upper limit, flow mark inhibitory ability of the resin composition in a long-run operation may be insufficient.

The lower limit of the difference between the melting point of the EVOH (A) and the melting point of the EVOH (B) is preferably 12° C., more preferably 14° C., still more preferably 15° C., and particularly preferably 22° C. The upper limit of the difference between the melting point of the EVOH (A) and the melting point of the EVOH (B) is preferably 80° C., more preferably 40° C., still more preferably 34° C., and particularly preferably 28° C. When the difference between the melting points is less than the lower limit, the heat stretching properties of the resin composition may be insufficient. To the contrary, when the difference between the melting points is greater than the upper limit, the flow mark inhibitory ability of the resin composition in a long-run operation may be insufficient.

In regard to the content of the EVOH (A) and the EVOH (B) in the resin composition, the lower limit of the mass ratio (A/B) of the EVOH (A) to the EVOH (B) is 60/40, preferably 65/35, and more preferably 70/30. Moreover, the upper limit of the mass ratio is 95/5, preferably 90/10, and more preferably 85/15. When the mass ratio is less than the lower limit, the barrier properties against various types of gases, and the oil resistance of the resin composition may be deteriorated. On the other hand, when mass ratio is greater than the upper limit, the flexibility, the heat stretching properties and the secondary processability of the resin composition may be deteriorated.

The total mass of the EVOH (A) and the EVOH (B) in the resin composition with respect to the resin content is preferably 80% by mass or more, more preferably 90% by mass or more, still more preferably 95% by mass or more, and particularly preferably 100% by mass.

(C) Unsaturated Aldehyde

The resin composition contains the unsaturated aldehyde (C). The unsaturated aldehyde (C) is an aldehyde having a carbon-carbon double bond or a carbon-carbon triple bond in its molecule. Due to containing the unsaturated aldehyde (C), the resin composition can inhibit the generation of flow marks in in a long-run operation, and consequently molded articles obtained exhibit superior appearance characteristics.

Although the reason why due to containing the unsaturated aldehyde (C), the resin composition can inhibit the generation of fish eyes, gels, streaks and the like caused by melt molding is not necessarily clear, it is assumed, for example, that: since the unsaturated aldehyde (C) tends to be oxidized more readily than the EVOH (A) and the EVOH (B), the unsaturated aldehyde (C) is oxidized more preferentially than the EVOH (A) and the EVOH (B), and as a result, the generation of the fish eyes, gels, streaks and the like which is presumed to be caused by oxidative degradation of the EVOH (A) and the EVOH (B) in the heat melting is inhibited; and the like.

Examples of the unsaturated aldehyde (C) include unsaturated aliphatic aldehydes having a carbon-carbon double bond in their molecule such as acrylaldehyde (acrolein), crotonaldehyde, methacrylaldehyde, 2-methyl-2-butenal, 2-butenal, 2-hexenal, 2,6-nonadienal, 2,4-hexadienal, 2,4,6-octatrienal, 2-hexenal and 5-methyl-2-hexenal; unsaturated aliphatic aldehydes having a carbon-carbon triple bond such as propiolaldehyde, 2-butyn-1-al and 2-pentyn-1-al; aromatic unsaturated aldehydes such as benzylaldehyde and phenethylaldehyde; and the like. Of these, unsaturated aliphatic aldehydes are preferred, linear or branched unsaturated aliphatic aldehydes having a carbon-carbon double bond are more preferred, and at least one selected from the group consisting of crotonaldehyde, 2,4-hexadienal and 2,4,6-octatrienal is/are still more preferred. Of these, crotonaldehyde having a boiling point of about 100° C. and having a high solubility in water is particularly preferred because of ease in eliminating an excess, or supplying a shortage as needed in a washing step and/or a drying step, for example, of a production process of the EVOH. The unsaturated aldehyde (C) has preferably 3 to 10 carbon atoms, more preferably 4 to 8 carbon atoms, and still more preferably 4, 6 or 8 carbon atoms, including the carbon atom in the aldehyde moiety.

The content of the unsaturated aldehyde (C) with respect to the resin content is 0.01 ppm or more, preferably 0.05 ppm or more, more preferably 0.1 ppm or more, still more preferably 0.15 ppm or more, and particularly preferably 0.2 ppm or more. On the other hand, the content of the unsaturated aldehyde (C) with respect to the resin content is less than 100 ppm, preferably 95 ppm or less, more preferably 50 ppm or less, still more preferably 30 ppm or less, and particularly preferably 20 ppm or less. When the content is less than the lower limit, the flow mark inhibitory ability of the resin composition in a long-run operation may be insufficient. To the contrary, when the content is greater than the upper limit, the crosslinking of the resin composition caused by the unsaturated aldehyde (C) may remarkably occur, leading to the generation of gels and seeds, and coloring of the resin composition is likely to occur. The content of the unsaturated aldehyde (C) in the resin composition as referred to herein means a proportion with respect to the resin content in the resin composition, i.e., a proportion by mass with respect to the total mass of the resin components, and more specifically, the proportion of the unsaturated aldehyde (C) with respect to the resin content in a dried resin composition.

Optional Components

Boron Compound

The resin composition may further contain a boron compound. When the resin composition further contains the boron compound, gelation is less likely to occur in melt molding, and a torque fluctuation of an extrusion molding machine and the like can be suppressed, resulting in an improvement of the appearance characteristics of the resultant molded articles.

Examples of the boron compound include:

boric acids such as orthoboric acid, metaboric acid and tetraboric acid;

boric acid esters such as triethyl borate and trimethyl borate;

boric acid salts such as alkali metal salts or alkaline earth metal salts of the aforementioned boric acids, and borax;

boron hydrides; and the like.

Of these, boric acids are preferred, and orthoboric acid is more preferred.

The content of the boron compound in the resin composition is preferably 100 ppm or more and 5,000 ppm or less, more preferably 100 ppm or more and 4,000 ppm or less, and still more preferably 150 ppm or more and 3,000 ppm or less. When the content of the boron compound falls within the above range, a torque fluctuation of an extrusion molding machine and the like in heat melting of the production process can be more effectively suppressed. On the other hand, when the content of the boron compound is less than 100 ppm, the effects described above may not be sufficiently achieved, whereas when the content of the boron compound is greater than 5,000 ppm, gelation of the resin composition is likely to occur and, as a result, appearance characteristics may be insufficient.

Conjugated Polyene Compound

The resin composition may further contain a conjugated polyene compound. When the resin composition further contains the conjugated polyene compound, oxidative degradation in melt molding can be inhibited, and thus coloring and the generation of defects such as fish eyes can be further inhibited, whereby molded articles, such as containers, that are superior in appearance characteristics can be obtained, and the flow marks generated in in a long-run operation can be inhibited.

The conjugated polyene compound as referred to means a compound having a conjugated double bond, as generally referred to, i.e., a compound having a structure in which two or more carbon-carbon double bonds are conjugated. The conjugated polyene compound may be a conjugated diene including two double bonds involved in the conjugation, a conjugated triene including three double bonds involved in the conjugation, or a conjugated polyene including four or more double bonds involved in the conjugation. In addition, the conjugated double bond may be present in a multiple number in a single molecule without being conjugated with one another. For example, compounds having three conjugated triene structures in the same molecule, such as tung oil, may also be included in the conjugated polyene compound.

The conjugated polyene compound preferably has 7 or less conjugated double bonds. When the resin composition contains a conjugated polyene compound having 8 or more conjugated double bonds, coloring of the molded articles is likely to occur. The conjugated polyene compound has preferably 4 to 30 carbon atoms, and more preferably 4 to 10 carbon atoms.

The conjugated polyene compound may include, in addition to the conjugated double bond, other functional group such as a carboxyl group and a salt thereof, a hydroxyl group, an ester group, a carbonyl group, an ether group, an amino group, an imino group, an amide group, a cyano group, a diazo group, a nitro group, a sulfonic acid group and a salt thereof, a sulfonyl group, a sulfoxide group, a sulfide group, a thiol group, a phosphoric acid group and a salt thereof, a phenyl group, a halogen atom, a double bond, and a triple bond.

Examples of the conjugated polyene compound include:

conjugated diene compounds such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, cembrene, sorbic acid, sorbic acid esters, sorbic acid salts and abietic acid;

conjugated triene compounds such as 1,3,5-hexatriene, 2,4,6-octatriene-1-carboxylic acid, eleostearic acid, tung oil and cholecalciferol;

conjugated polyene compounds such as cyclooctatetraene, 2,4,6,8-decatetraene-1-carboxylic acid, retinol and retinoic acid; and the like. The conjugated polyene compound may be used either alone, or two or more types thereof may be used in combination.

Of these, sorbic acid, sorbic acid esters, sorbic acid salts, myrcene and a mixture of any two or more types thereof are preferred, and sorbic acid, sorbic acid salts and a mixture thereof are more preferred. Sorbic acid, sorbic acid salts and a mixture thereof exhibit superior suppressive effects on oxidative degradation at high temperatures, and are preferred also in light of hygienic properties and availability since they are industrially used broadly also as food additives.

The molecular weight of the conjugated polyene compound is typically 1,000 or less, preferably 500 or less, and more preferably 300 or less. When the molecular weight of the conjugated polyene compound is greater than 1,000, the state of dispersion in the EVOH (A) and/or the EVOH (B) may be inferior, and thus the appearance characteristics after the melt molding may be unfavorable.

The content of the conjugated polyene compound is preferably 0.01 ppm or more and 1,000 ppm or less, more preferably 0.1 ppm or more and 1,000 ppm or less, still more preferably 0.5 ppm or more and 800 ppm or less, and particularly preferably 1 ppm or more and 500 ppm or less. In the resin composition, when the content of the conjugated polyene compound is less than 0.01 ppm, the effect of suppressing oxidation degradation in melt molding may not be sufficiently achieved. On the other hand, when the content of the conjugated polyene compound is greater than 1,000 ppm, gelation of the resin composition may be accelerated; therefore, unfavorable appearance characteristics of the molded articles are likely to be found.

Japanese Unexamined Patent Application, Publication No. H9-71620 discloses that when a conjugated polyene compound is added in a step following the polymerization step, a resin composition containing less gelatinous seeds generated can be obtained in molding; however, in the present invention, since the unsaturated aldehyde (C) is also added in addition to the conjugated polyene compound, coloring and the generation of defects such as fish eyes can be further inhibited, leading to an improvement of appearance characteristics of the molded articles, and additionally a resin composition also exhibiting superior long-run workability can be obtained.

Acetic Acid and/or Acetic Acid Salt

The resin composition may contain acetic acid and/or an acetic acid salt. When the resin composition further contains acetic acid and/or the acetic acid salt, coloring of the product after the melt molding can be prevented, and therefore the appearance characteristics of the molded articles obtained can be improved.

Of acetic acid and/or the acetic acid salt, both acetic acid and the acetic acid salt are preferably used, and both acetic acid and sodium acetate are more preferably used.

The content of acetic acid and/or the acetic acid salt is preferably 50 ppm or more and 1,000 ppm or less, more preferably 100 ppm or more and 1,000 ppm or less, still more preferably 150 ppm or more and 500 ppm or less, and particularly preferably 200 ppm or more and 400 ppm or less. When the content of acetic acid and/or the acetic acid salt is less than 50 ppm, a sufficient preventive effect on coloring cannot be achieved; therefore, appearance characteristics may be insufficient because of yellowing and the like. On the other hand, when the content of acetic acid and/or the acetic acid salt is greater than 1,000 ppm, gelation is likely to occur in melt molding, particularly in melt molding over a long time period, and thus the appearance may be unfavorable.

Phosphorus Compound

The resin composition may further contain a phosphorus compound. When the resin composition further contains the phosphorus compound, coloring and the generation of defects such as gels and seeds can be further inhibited, and thus appearance characteristics can be improved.

Examples of the phosphorus compound include various types of phosphoric acids such as phosphoric acid and phosphorous acid, phosphate, and the like.

The phosphate may be in any form of a monobasic phosphate salt, a dibasic phosphate salt and a tribasic phosphate salt. In addition, the cationic species contained in the phosphate is not particularly limited, and alkali metal salts and alkaline earth metal salts are preferred. Of these, sodium dihydrogen phosphate, potassium dihydrogen phosphate, disodium hydrogen phosphate and dipotassium hydrogen phosphate are more preferred, and sodium dihydrogen phosphate and dipotassium hydrogen phosphate are still more preferred.

The content of the phosphorus compound is preferably 1 ppm or more and 200 ppm or less, more preferably 2 ppm or more and 200 ppm or less, still more preferably 3 ppm or more and 150 ppm or less, and particularly preferably 5 ppm or more and 100 ppm or less. When the content of the phosphorus compound in the resin composition is less than 1 ppm, or is greater than 200 ppm, thermal stability may be deteriorated in the production process, and thus coloring and the generation of gels and seeds become likely to occur, which may lead to insufficient appearance characteristics. It is to be noted that the content of the phosphorus compound is a value derived in terms of a phosphorus element equivalent.

Other Optional Components

The resin composition may contain an alkali metal as other optional component, within a range not leading to impairment of the effects of the present invention. Examples of the alkali metal include lithium, sodium, potassium, and the like. Moreover, the alkali metal may be contained in the form of an alkali metal salt. Examples of the alkali metal salt include aliphatic carboxylic acid salts, aromatic carboxylic acid salts and metal complexes of a monovalent metal, and the like. Specific examples include sodium acetate, potassium acetate, sodium stearate, potassium stearate, sodium salts of ethylenediaminetetraacetic acid, and the like. Of these, sodium acetate and potassium acetate are preferred. The content of the alkali metal in the EVOH-containing resin composition is preferably 20 to 1,000 ppm, and more preferably 50 to 500 ppm.

The resin composition may contain, as other optional component, an antioxidant, an UV absorbent, a plasticizer, an antistatic agent, a lubricant, a colorant, a filler, a heat stabilizer, other resin, a metal salt of a higher aliphatic carboxylic acid, a hydrotalcite compound and the like, as well as the aforementioned alkali metal. The EVOH-containing resin composition may contain one, or two or more types of these optional components, and the content of the optional component (s) is 1% by mass or less in total.

Examples of the antioxidant include 2,5-di-t-butylhydroquinone, 4,4'-thiobis-(6-t-butylphenol), 2,2'-methylene-bis-(4-methyl-6-t-butylphenol), octadecyl 3-(3',5'-di-t-butyl-4'-hydroxyphenyl)propionate, and the like.

Examples of the UV absorbent include ethylene 2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, and the like.

Examples of the plasticizer include dimethyl phthalate, diethyl phthalate, dioctyl phthalate, waxes, liquid paraffins, phosphoric acid esters, and the like.

Examples of the antistatic agent include pentaerythritol monostearate, sorbitan monopalmitate, sulfated polyolefins, polyethylene oxides, Carbowax (trade name), and the like.

Examples of the lubricant include ethylene bisstearamide, butyl stearate, and the like.

Examples of the colorant include carbon black, phthalocyanine, quinacridone, indoline, azo pigments, colcothar, and the like.

Examples of the filler include glass fibers, wollastonite, calcium silicate, talc, montmorillonite, and the like.

Examples of the heat stabilizer include hindered phenol compounds, hindered amine compounds, and the like.

Examples of the other resin include polyamides, polyolefins, and the like.

Examples of the metal salt of a higher aliphatic carboxylic acid include calcium stearate, magnesium stearate, and the like.

It is to be noted that in order to prevent generation of gels, one, or two or more types of the hydrotalcite compound, the hindered phenol heat stabilizer, the hindered amine heat stabilizer and the metal salt of a higher aliphatic carboxylic acid may be added in an amount of 0.01 to 1% by mass.

Production Method of Resin Composition

The production method of the resin composition is not particularly limited as long as the EVOH (A), the EVOH (B) and the unsaturated aldehyde (C) can be homogeneously blended.

In a method for producing ethylene-vinyl alcohol copolymer including:

(1) copolymerizing ethylene with a vinyl ester; and (2) saponifying the copolymer obtained in the step (1), the procedure for homogeneously blending the unsaturated aldehyde (C) into the resin composition in the specified content with respect to the resin content may be exemplified by the following:

a procedure in which a specific amount of the unsaturated aldehyde (C) is added in the step (1);

a procedure in which a specific amount of the unsaturated aldehyde (C) is added in the step (2);

a procedure in which a specific amount of the unsaturated aldehyde (C) is added to the EVOH obtained in the step (2);

a procedure in which the amount of the unsaturated aldehyde (C) which may be formed as degradation products or the like of a monomer such as ethylene and a vinyl ester is adjusted by regulating various types of conditions such as the amount of the monomer, the type and amount of a polymerization initiator, the polymerization temperature, and the polymerization time in the step (1);

a procedure in which the amount of the unsaturated aldehyde (C) which may be formed through degradation of the polymer main chain and the like is adjusted by regulating various types of conditions such as the type and amount of an alkali added, the reaction temperature, and the reaction time in saponifying the ethylene-vinyl ester copolymer in the step (2);

a procedure in which the abovementioned procedures are employed in combination; and the like.

It is to be noted that when the procedure in which a specific amount of the unsaturated aldehyde (C) is added in the step (1), or the procedure in which a specific amount of the unsaturated aldehyde (C) is added in the step (2) is employed, it is necessary for the addition to be carried out within a range not leading to inhibition of the polymerization reaction in the step (1) or the saponification reaction in the step (2).

Of these procedures, in light of the ease of regulating the content of the unsaturated aldehyde (C) in the resin composition, the procedure in which a specific amount of the unsaturated aldehyde (C) is added to the EVOH obtained in the step (2) is preferred.

The procedure for adding a specific amount of the unsaturated aldehyde (C) to the EVOH is exemplified by:

a procedure in which a specific amount of the unsaturated aldehyde (C) is added only to the EVOH (A), whereby the amount in the final composition is adjusted;

a procedure in which a specific amount of the unsaturated aldehyde (C) is added only to the EVOH (B), whereby the amount in the final composition is adjusted;

a procedure in which a specific amount of the unsaturated aldehyde (C) is added to both the EVOH (A) and the EVOH (B), whereby the amount in the final composition is adjusted; and the like. Of these, in light of handling property, a procedure in which a specific amount of the unsaturated aldehyde (C) is added only to the EVOH (A) or only to the EVOH (B) is more preferred.

The procedure for adding a specific amount of the unsaturated aldehyde (C) to the EVOH is exemplified by:

a procedure in which pelletizing is carried out after blending the unsaturated aldehyde (C) with the EVOH beforehand to give pellets;

a procedure in which a strand obtained by deposition of a paste after the saponification of the ethylene-vinyl ester copolymer is impregnated with the unsaturated aldehyde (C);

a procedure in which a strand obtained by deposition is impregnated with the unsaturated aldehyde (C) after cutting the strand;

a procedure in which the unsaturated aldehyde (C) is added to a solution of redissolved chips of a dry resin composition;

a procedure in which a blend of two components of the EVOH and the unsaturated aldehyde (C) is melt kneaded;

a procedure in which the unsaturated aldehyde (C) is fed to be contained in a melt of the EVOH during extrusion;

a procedure in which a masterbatch is produced by blending a high concentration of the unsaturated aldehyde (C) with a part of the EVOH and pelletizing the blend, the masterbatch is dry blended with the EVOH and the mixture is melt kneaded; and the like.

Of these, the procedure in which pelletizing is carried out after blending the unsaturated aldehyde (C) with the EVOH beforehand to give pellets is preferred in light of a possibility of more homogenously dispersing a slight amount of the unsaturated aldehyde (C) in the EVOH. Specifically, the unsaturated aldehyde (C) is added to a solution prepared by dissolving the EVOH in a good solvent such as a mixed solvent of water and methanol, and thus resulting mixture solution is extruded into a poor solvent through a nozzle or the like to allow for deposition and/or coagulation, followed by washing and/or drying the same, whereby the pellets including the unsaturated aldehyde (C) homogenously mixed with the EVOH can be obtained.

The procedure for allowing each component other than the unsaturated aldehyde (C) to be contained in the resin composition may be exemplified by:

mixing the pellets with each component, followed by melt kneading;

mixing each component together with the unsaturated aldehyde (C) in preparing the pellets;

immersing the pellets in a solution containing each component; and the like. It is to be noted that a ribbon blender, a high speed mixer, a cokneader, a mixing roll, an extruder, an intensive mixer and the like may be employed for the mixing.

Molded Article

The resin composition is molded into various types of molded articles such as films, sheets, containers, pipes, hoses, fibers and packaging materials through melt molding and the like. Examples of the melt molding process include extrusion molding, inflation extrusion, blow molding, melt spinning, injection molding, injection blow molding, and the like. The melt molding temperature may vary in accordance with the melting point of the EVOH (A) and the melting point of the EVOH (B), and the like, but is preferably about 150° C. to 270° C.

The molded article obtained through the aforementioned melt molding and the like may be subjected to secondary processing molding such as bending processing, vacuum molding, blow molding and press molding as needed, to give a molded article as intended, such as containers.

Although the molded article may be a molded article having a single-layer structure constituted with only a barrier layer formed from the resin composition (hereinafter, may be also referred to as "barrier layer"), the molded article preferably has a multilayer structure including the barrier layer and other layer laminated on at least one face of the barrier layer, in light of an improvement of functions thereof.

Examples of the molded article having a multilayer structure include multilayer sheets, multilayer pipes, multilayer fibers, and the like.

The other layer constituting the molded article of the aforementioned multilayer structure is preferably, for example, a thermoplastic resin layer formed from a thermoplastic resin. Due to including the barrier layer and the thermoplastic resin layer, the molded article of the multilayer structure exhibits superior appearance characteristics and heat stretching properties.

Examples of preferred resins for forming the thermoplastic resin layer include:

polyethylenes having a high, medium or low density;

polyethylenes prepared through copolymerization with vinyl acetate, an acrylic acid ester, or an α-olefin such as butene and hexene;

ionomer resins;

polypropylene homopolymers;

polypropylenes prepared through copolymerization with an α-olefin such as ethylene, butene and hexene;

polyolefins such as modified polypropylenes obtained by blending a rubber polymer into polypropylenes;

resins obtained by addition or grafting of maleic anhydride to these resins;

polyamide resins, polyester resins, polystyrene resins, polyvinyl chloride resins, acrylic resins, polyurethane resins, polycarbonate resins, polyvinyl acetate resins, and the like.

Of these, as the resin for forming the thermoplastic resin layer, polyethylenes, polypropylenes, polyamide resins and polyester resins are preferred.

Although the layer structure of the molded article of the multilayer structure is not particularly limited, in light of moldability, cost and the like, examples of a typical layer structure include those having: a thermoplastic resin layer/barrier layer/thermoplastic resin layer; a barrier layer/adhesive resin layer/thermoplastic resin layer; and a thermoplastic resin layer/adhesive resin layer/barrier layer/adhesive resin layer/thermoplastic resin layer. Of these layer structures, the layer structure having a thermoplastic resin layer/barrier layer/thermoplastic resin layer; or a thermoplastic resin layer/adhesive resin layer/barrier layer/adhesive resin layer/thermoplastic resin layer is preferred. In a case where the thermoplastic resin layers are provided on two outer sides of the barrier layer, respectively, the thermoplastic resin layers provided as two outer layers may be formed from resins different from each other, or may be formed from an identical resin.

Although a method for producing the molded article having the multilayer structure is not particularly limited, examples thereof include an extrusion lamination process, a dry lamination process, an extrusion blow molding process, a coextrusion lamination process, a coextrusion molding process, a coextrusion pipe molding process, a coextrusion blow molding process, a coinjection molding process, a solution coating process, and the like.

Of these, the method for producing the multilayer sheet is preferably a coextrusion lamination process or a coextrusion molding process, and more preferably a coextrusion molding process. When the barrier layer and the thermoplastic resin layer are laminated using any of the aforementioned processes, the multilayer sheet can be easily and reliably produced, resulting in superior appearance characteristics and heat stretching properties of the multilayer sheet.

Examples of a process for further forming a molded article using the multilayer sheet include a heat-stretching process, a vacuum molding process, a pressure forming process, a vacuum-pressure forming process, a blow molding process, and the like. These forming/molding processes are typically carried out at a temperature falling within the range of the melting point of the EVOH or below. Of these, a heat-stretching process and a vacuum-pressure forming process are preferred. In the heat-stretching process, the multilayer sheet is heated, and then stretched along one direction or a plurality of directions to achieve molding. In the vacuum-pressure forming process, the multilayer sheet is heated, and molded using a combination of a vacuum and a pressure. By way of an example of the molded article, a packaging material obtained through molding of the aforementioned multilayer sheet using the heat-stretching process can be easily and reliably produced, and additionally exhibit superior appearance characteristics and inhibited flow marks. A container obtained through molding of the aforementioned multilayer sheet using the vacuum-pressure forming process can be easily and reliably produced, and additionally exhibit superior appearance characteristics and inhibited flow marks. In addition, continuity of the resin composition layers can be maintained, and therefore the container can exhibit superior gas barrier properties.

In the case of the heat-stretching process, the thermoplastic resin which may be used is preferably stretchable within a range of heat-stretching temperature satisfying the following inequality (2).

$$X-110 \leq Y \leq X-10 \tag{2}$$

In the above inequality (2), X represents the melting point (° C.) of the EVOH (A); and Y represents the heat-stretching temperature (° C.).

In a case where the packaging material is produced using the multilayer sheet through the heat-stretching process, when the resin is used as the thermoplastic resin, more superior appearance characteristics can be exhibited, and additionally defects such as cracks can be further inhibited.

Alternatively, the molded article can be molded through a coinjection stretch-blow molding process using the aforementioned resin composition and other resin composition. In the coinjection stretch-blow molding process, a preformed material having the multilayer structure is obtained through coinjection molding using two or more types of resin compositions, and subsequently the preformed material is subjected to heat stretch-blow molding. Due to being molded using the resin composition exhibiting the aforementioned characteristics through the coinjection stretch-blow molding process, the molded article can be easily and reliably produced, and can exhibit superior appearance characteristics and inhibited flow marks. Examples of the other resin composition include the aforementioned thermoplastic resins, and the like.

It is to be noted that scraps generated in carrying out the heat molding and the like such as the extrusion molding and the blow molding may be reused through blending in the thermoplastic resin layer, or may be separately used as a recovery layer.

In the aforementioned vacuum-pressure forming process, the multilayer sheet is, for example, heated to be softened, and thereafter molded so as to fit a die shape. Examples of the molding process include a process in which molding is carried out so as to fit a die shape by means of vacuum or compressed air, which may be used in combination with a plug in addition, if necessary (a straight process, a drape process, an air slip process, a snap-back process, a plug-assist process, and the like), a press molding process, and the like. Various types of molding conditions such as the molding temperature, the degree of vacuum, the pressure of the compressed air and the molding speed may be appropriately determined in accordance with the shape of the plug and/or the die shape, as well as properties of a film and/or a sheet as a base material, and the like.

The molding temperature is not particularly limited as long as the resin is softened sufficiently to be molded at the temperature. For example, in a case where the multilayer sheet is subjected to heat molding, it is desired that the multilayer sheet is not exposed to: high temperatures at which melting of the multilayer sheet by heating occurs or the roughness of a metal surface of a heater plate is transferred to the multilayer sheet; or low temperatures at which shaping cannot be sufficiently attained. Specifically, the temperature of the multilayer sheet is 50° C. to 180° C., and suitably 60° C. to 160° C.

A container according to another embodiment of the present invention is produced by heat molding the multilayer sheet into a three-dimensional shape such that a recessed part is provided on the plane of the multilayer sheet. The container is suitably molded through the aforementioned vacuum-pressure forming process. The shape of the recessed part may be determined in accordance with the shape of contents. In particular, as the depth of the recessed part is greater, or as the shape of the recessed part is less smooth, the improvement effect exerted by the present invention is significant, since for such a shape of the recessed part, typical EVOH laminates are more likely to cause unevenness in thickness, leading to extreme slimming at corner portions and the like. In a case where the container is obtained through molding of a multilayer sheet having a total thickness of all layers of less than about 300 μm, the effects of the invention may be exhibited more effectively at a draw ratio (S) of suitably 0.2 or more, more suitably 0.3 or more, and still more suitably 0.4 or more. Alternatively, in a case where the container is obtained through molding of a multilayer sheet having a total thickness of all layers of about 300 μm or more, the effects of the invention may be exhibited more effectively at a draw ratio (S) of suitably 0.3 or more, more suitably 0.5 or more, and still more suitably 0.8 or more.

The draw ratio (S) as referred to herein means a value calculated using the following equation (3):

$$S=(\text{a depth of the container})/(\text{a maximum diameter of a circle inscribed in the opening of the container}) \qquad (3)$$

In other words, the draw ratio (S) is a value obtained by dividing a value of the depth of the bottom of the recessed part of the container by a value of the diameter of the largest inscribed circle tangent to the shape of the recessed part (opening) provided on the plane of the multilayer sheet. For example, when the shape of the opening of the recessed part is circular, the value of the diameter of an inscribed circle having a maximum diameter means a diameter of the circular shape; when the shape of the opening of the recessed part is elliptical, the value of the diameter of an inscribed circle having a maximum diameter means a minor axis of the elliptical shape; and when the shape of the opening of the recessed part is rectangular, the value of the diameter of an inscribed circle having a maximum diameter means a length of the shorter side of the rectangular shape.

EXAMPLES

Hereinafter, the present invention is specifically explained by way of Examples, but the present invention is not in anyhow limited to these Examples. It is to be noted that each quantitative determination in these Examples was carried out using the following method.
Ethylene Content and Degree of Saponification of EVOH The determination was made based on $^1$H-NMR recorded on a nuclear magnetic resonance spectrometer (model "JNM-GX-500", manufactured by JEOL, Ltd.) using DMSO-$d_6$ as a solvent for the measurement.
Quantitative Determination of Unsaturated Aldehyde (C)

A 2,4-dinitrophenylhydrazine (DNPH) solution was prepared by adding 50 mL of 1,1,1,3,3,3-hexafluoroisopropanol (HFIP), 11.5 mL of acetic acid and 8 mL of ion exchanged water to 200 mg of a 50% by mass aqueous DNPH solution. To 20 mL of this DNPH solution were added 1 g of pellets for measurement, and dissolved with stirring at 35° C. for 1 hour. Acetonitrile was added to this solution to permit deposition and sedimentation of the resin content, and the solution obtained after the filtration was concentrated to obtain an extracted sample. The extracted sample was analyzed for quantitative determination on high performance liquid chromatography under the following conditions. Thus, the amount of the unsaturated aldehyde (C) was quantitatively determined. It is to be noted that upon the quantitative determination, a calibration curve produced by allowing an authentic sample of each unsaturated aldehyde (C) to react with the DNPH solution was used. It is to be noted that the lower limit of detection of the unsaturated aldehyde (C) was 0.01 ppm.

column: TSKgel 80Ts (manufactured by Tosoh Corporation)
mobile phase: water/acetonitrile (volume ratio: water/acetonitrile=52:48)
detector: PDA (360 nm), TOF-MS
Synthesis of EVOH (A)

Synthesis Example 1

Using a 250 L pressure reactor, the polymerization was carried out under the following conditions to synthesize an ethylene-vinyl acetate copolymer.
Amount Charged:
vinyl acetate: 83.0 kg
methanol: 17.4 kg
2,2'-azobisisobutyronitrile: 66.4 g
polymerization temperature: 60° C.
Polymerization Conditions:
pressure of ethylene in polymerization vessel: 3.9 MPa
polymerization time: 3.5 hrs The conversion of vinyl acetate in the polymerization was 36%. After sorbic acid was added to the resultant copolymerization reaction liquid, the liquid was supplied to a purge tower, and after unreacted vinyl acetate was eliminated from the top of the tower by introducing methanol vapor from the bottom of the tower, a 41% by mass methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester unit in the copolymer. Thereto was further added methanol to adjust the copolymer concentration of 20% by mass. The temperature of this solution was elevated to 60° C., and the reaction was allowed while blowing nitrogen gas into the reactor for about 4 hrs. This solution was then extruded from a die plate provided with a circular opening into water to permit deposition, followed by cutting to give pellets having a diameter of about 3 mm and a length of about 5 mm. After the pellets were subjected to deliquoring using a centrifugal separator, the pellets were washed by repeating an operation of the deliquoring after further adding a large amount of water to obtain pellets of the EVOH (A). The degree of saponification of the EVOH (A) thus obtained was 99.95 mol %.

Moreover, EVOHs (A) having a predetermined ethylene content (degree of saponification: 99.95 mol %) shown in Table 1 below were synthesized in a similar manner to the procedure described above.

Synthesis Example 2

Pellets were obtained by polymerizing, saponifying, pelletizing and washing in a similar manner to Synthesis Example 1 except that crotonaldehyde was supplied so as to be contained in an amount of 0.5 ppm with respect to the EVOH (A) during the polymerization. The degree of saponification of the EVOH (A) thus obtained was 99.95 mol %.
Synthesis of EVOH (B)

Synthesis Example 3

EVOH (B) having an ethylene content of 44 mol % and a degree of saponification of 99.95 mol % was synthesized in the form of pellets in a similar manner to the synthesis method of EVOH (A) according to Synthesis Example 1.

In addition, EVOHs (B) having a predetermined ethylene content shown in Table 1 below (degree of saponification being 99.95 mol %) were synthesized in a similar manner.

Synthesis Example 4

EVOH (B) having an ethylene content of 44 mol % and a degree of saponification of 90 mol % was synthesized in the form of pellets in a similar manner to the synthesis method of EVOH (A) described in Synthesis Example 2 above.

Synthesis Example 5

A modified EVOH (B) was synthesized using epoxypropane and the EVOH (B) having an ethylene content of 44 mol % and a degree of saponification of 99.95 mol %, which was obtained in Synthesis Example 3 described above, on TEM-35BS (37 mmφ, L/D=52.5) manufactured by Toshiba Machine Co., Ltd., by injecting epoxypropane from C9 under conditions involving the barrels C2 and C3 at 200° C., barrel C4 to C15 at 240° C. and the number of revolution of 400 rpm. The degree of modification of the resultant modified EVOH (B) with respect to the total vinyl alcohol units was 8 mol %.

In the case of the degree of saponification of 99.95 mol %, the melting point of the obtained EVOH was 160° C., 165° C., 177° C., 183° C., 191° C. and 208° C. for the ethylene content of 48 mol %, 44 mol %, 35 mol %, 32 mol %, 27 mol % and 15 mol %, respectively. On the other hand, in the case of the degree of saponification of 90 mol % and the ethylene content of 44 mol %, the melting point of the obtained EVOH was 134° C. The melting point of the modified EVOH (B) was 106° C.
Preparation of Resin Composition

Examples 1 to 10, 14 and 15, and Comparative Examples 2 to 4

Twenty kg of the pellets of the EVOH (A) obtained in Synthesis Example 1 or Synthesis Example 2 described above were added to 180 kg of a mixed solvent of water and methanol (mass ratio: water/methanol=40/60), and the mixture was stirred at 60° C. for 6 hrs to completely dissolve the pellets. To the solution thus obtained were added a predetermined amount of crotonaldehyde and sorbic acid, and the mixture was further stirred for 1 hour such that crotonaldehyde was completely dissolved, whereby a resin solution was obtained. This resin solution was continuously extruded from a nozzle having a diameter of 4 mm into a coagulation bath containing a mixture of water and methanol (mass ratio: water/methanol=90/10) adjusted at 0° C. thereby permitting coagulation so as to give a strand form. This strand was introduced into a pelletizing machine to obtain porous resin composition chips. The resultant chips were washed with an aqueous acetic acid solution and ion exchanged water. The chips were separated from the washing liquid, followed by deliquoring, and thereafter were dried in a hot-air dryer at 80° C. for 4 hrs and further at 100° C. for 16 hrs to obtain crotonaldehyde-containing EVOH (A) pellets. The amount of each component in the obtained pellets was quantitatively determined using the aforementioned quantitative determination methods, and the amount was designated as the content in the EVOH (A). Similarly, crotonaldehyde-containing EVOH (B) pellets were obtained in a similar manner from the EVOH (B) obtained in Synthesis Example 3 or Synthesis Example 4 described above. In this procedure, the crotonaldehyde-containing EVOH (B) pellets were prepared such that the content of crotonaldehyde with respect to the total mass of the EVOH (A) and the EVOH (B) was as shown in Table 1, by determining the content of crotonaldehyde in the EVOH (B) beforehand through the aforementioned quantitative determination method and adjusting the amount of crotonaldehyde added and the concentration of each component in the aqueous solution for the immersion treatment according to this procedure.

The crotonaldehyde-containing EVOH (A) pellets, and the EVOH (B) pellets or the crotonaldehyde-containing EVOH (B) pellets each prepared above were mixed such that each content was as shown in Table 1. After dry blending, the blended matter was subjected to extrusion and pelletization using a twin-screw extruder (2D25W; manufactured by Toyo Seiki Seisaku-sho, Ltd.; 25 mmφ; die temperature of 220° C.; and a screw rotation speed of 100 rpm) under a nitrogen atmosphere, whereby intended resin composition pellets were obtained.

Example 11

Twenty kg of the pellets of the EVOH (A) obtained in Synthesis Example 1 described above were added to 180 kg of a mixed solvent of water and methanol (mass ratio: water/methanol=40/60), and the mixture was stirred at 60° C. for 6 hrs to completely dissolve the pellets. To the solution thus obtained were added a predetermined amount of crotonaldehyde and sorbic acid, and the mixture was further stirred for 1 hour such that crotonaldehyde was completely dissolved, whereby a resin solution was obtained. This resin solution was continuously extruded from a nozzle having a diameter of 4 mm into a coagulation bath containing a mixture of water and methanol (mass ratio: water/methanol=90/10) adjusted at 0° C. thereby permitting coagulation so as to give a strand form. This strand was introduced into a pelletizing machine to obtain porous resin composition chips. The resultant chips were washed with an aqueous acetic acid solution and ion exchanged water. The chips were separated from the washing liquid, followed by deliquoring, and thereafter were dried in a hot-air dryer at 80° C. for 4 hrs and further at 100° C. for 16 hrs to obtain crotonaldehyde-containing EVOH (A) pellets. The amount of each component in the obtained pellets was quantitatively determined using the aforementioned quantitative determination methods, and the amount was designated as the content in the EVOH (A). Similarly, crotonaldehyde-containing EVOH (B) pellets were obtained in a similar manner from the modified EVOH (B) obtained in Synthesis Example 5 described above. In this procedure, the resin composition pellets were prepared in a similar manner to the procedure described above such that the content of crotonaldehyde with respect to the total mass of the EVOH (A) and the EVOH (B) was as shown in Table 1 by determining the content of crotonaldehyde in the EVOH (B) beforehand through the aforementioned quantitative determination method and adjusting the amount of crotonaldehyde added and the concentration of each component in the aqueous solution for the immersion treatment according to this procedure.

Comparative Example 1

Twenty kg of the pellets obtained in Synthesis Example 2 described above were washed with an aqueous acetic acid solution and ion exchanged water. The chips were separated from the washing liquid, followed by deliquoring, and thereafter were dried in a hot-air dryer at 80° C. for 4 hrs and further at 100° C. for 16 hrs to obtain EVOH (A) pellets. Similarly, the EVOH (B) obtained in Synthesis Example 4 described above was treated in a similar manner, and thereafter resin composition pellets were prepared in a similar manner to the procedure described above.

Example 12

Resin composition pellets that contained 2,4-hexadienal were prepared in a similar manner to Example 1 except that 2,4-hexadienal was used in place of crotonaldehyde.

Example 13

Resin composition pellets that contained 2,4,6-octatrienal were prepared in a similar manner to Example 1 except that 2,4,6-octatrienal was used in place of crotonaldehyde.
Evaluations of Resin Compositions Each resin composition obtained in this manner was evaluated using the following methods. The results of the evaluations are shown together in Tables 1.
Flow Mark Inhibitory Ability Using a single-screw extruding machine (D2020; manufactured by Toyo Seiki Seisaku-sho, Ltd.; D (mm)=20, L/D=20, compression ratio=2.0, screw: full flight), a single-layer film having a thickness of 150 μm was produced from the resin composition pellets obtained above in each Example or Comparative Example. The molding conditions are shown below.

extrusion temperature: 210° C.
screw rotation speed: 100 rpm
die width: 15 cm
roll drawing temperature: 80° C.
roll drawing speed: 0.9 m/min A continuous operation was carried out under the conditions described above to produce a single-layer film, and with respect to each film produced after 8 hrs from the start of the operation, appearance thereof was evaluated by a visual inspection. The flow mark inhibitory ability was evaluated to be "A (favorable)" in a case where no flow mark was found, to be "B (somewhat favorable)" in a case where a small flow mark was found or the generation frequency of flow marks was low, and to be "C (unfavorable)" in a case where large flow marks were found and the generation frequency thereof was high.
Coloring Inhibitory Ability The film obtained after 8 hrs in the aforementioned molding was visually observed to evaluate coloring thereof in accordance with the following criteria:

"A (favorable)": colorless;
"B (somewhat favorable)": yellowed; and
"C (unfavorable)": significantly yellowed.
Heat Stretching Properties The film obtained above was preheated at 80° C. for 30 sec in a pantograph type biaxially stretching apparatus manufactured by Toyo Seiki Seisaku-sho, Ltd., and thereafter simultaneously biaxially stretched with a draw ratio of 3×3 times to obtain a stretched film. The obtained stretched film was visually observed to evaluate the heat stretching properties in accordance with the following criteria.

"A (favorable)": no crack being generated;
"B (somewhat favorable)": cracks being locally found; and
"C (unfavorable)": cracks being entirely found

TABLE 1

| | EVOH (A) | | EVOH (B) | | | Melting point difference (° C.) | Unsaturated aldehyde (C) | | Sorbic acid content (ppm) | Appearance characteristics | | Heat stretchability |
|---|---|---|---|---|---|---|---|---|---|---|---|---|
| | ethylene content (mol %) | amount blended (parts by mass) | ethylene content (mol %) | degree of modification (mol %) | degree of saponification (%) | amount blended (parts by mass) | | type | content (ppm) | | flow-mark inhibitory ability | coloring inhibitory ability | |
| Example 1 | 32 | 80 | 44 | 0 | 99.95 | 20 | 18 | crotonaldehyde | 0.08 | 200 | B | A | A |
| Example 2 | 32 | 80 | 44 | 0 | 99.95 | 20 | 18 | crotonaldehyde | 42 | 200 | A | B | A |
| Example 3 | 32 | 80 | 44 | 0 | 99.95 | 20 | 18 | crotonaldehyde | 0.3 | 200 | A | A | A |
| Example 4 | 32 | 90 | 44 | 0 | 99.95 | 10 | 18 | crotonaldehyde | 0.3 | 200 | A | A | A |
| Example 5 | 32 | 60 | 44 | 0 | 99.95 | 40 | 18 | crotonaldehyde | 0.3 | 200 | A | A | A |
| Example 6 | 27 | 80 | 44 | 0 | 99.95 | 20 | 26 | crotonaldehyde | 0.3 | 200 | A | A | A |
| Example 7 | 32 | 80 | 48 | 0 | 99.95 | 20 | 23 | crotonaldehyde | 0.3 | 200 | A | A | A |
| Example 8 | 35 | 80 | 44 | 0 | 99.95 | 20 | 12 | crotonaldehyde | 0.3 | 200 | A | A | B |
| Example 9 | 27 | 80 | 35 | 0 | 99.95 | 20 | 14 | crotonaldehyde | 0.3 | 200 | A | A | B |
| Example 10 | 32 | 80 | 44 | 0 | 90 | 20 | 49 | crotonaldehyde | 0.3 | 200 | A | B | A |
| Example 11 | 32 | 90 | 44 | 8 | 99.95 | 10 | 77 | crotonaldehyde | 0.3 | 200 | A | A | A |
| Example 12 | 32 | 80 | 44 | 0 | 99.95 | 20 | 18 | 2,4-hexadienal | 0.3 | 200 | A | B | A |
| Example 13 | 32 | 80 | 44 | 0 | 99.95 | 20 | 18 | 2,4,6-octatrienal | 0.3 | 200 | A | B | A |
| Example 14 | 32 | 80 | 44 | 0 | 99.95 | 20 | 18 | crotonaldehyde | 0.02 | 200 | B | C | A |

TABLE 1-continued

| | EVOH (A) | | EVOH (B) | | | | Melting point difference (° C.) | Unsaturated aldehyde (C) | | Sorbic acid content (ppm) | Appearance characteristics | | |
|---|---|---|---|---|---|---|---|---|---|---|---|---|---|
| | ethylene content (mol %) | amount blended (parts by mass) | ethylene content (mol %) | degree of modification (mol %) | degree of saponification (%) | amount blended (parts by mass) | | type | content (ppm) | | flow-mark inhibitory ability | coloring inhibitory ability | Heat stretch-ability |
| Example 15 | 32 | 80 | 44 | 0 | 99.95 | 20 | 18 | crotonaldehyde | 90 | 200 | B | B | B |
| Comparative Example 1 | 32 | 80 | 44 | 0 | 99.95 | 20 | 18 | crotonaldehyde | N.D. *1 | 200 | C | B | C |
| Comparative Example 2 | 32 | 80 | 44 | 0 | 99.95 | 20 | 18 | crotonaldehyde | 100 | 200 | C | C | C |
| Comparative Example 3 | 15 | 80 | 44 | 0 | 99.95 | 20 | 50 | crotonaldehyde | 0.3 | 200 | C | C | C |
| Comparative Example 4 | 32 | 98 | 44 | 0 | 99.95 | 2 | 18 | crotonaldehyde | 0.3 | 200 | A | A | C |

*1: less than lower limit of detection (0.01 ppm)

As is clear from the results shown in Table 1, the resin compositions of Examples were superior in flow mark inhibitory ability, coloring inhibitory ability and heat stretching properties. On the other hand, it was found that the resin compositions of Comparative Examples in which the content of the unsaturated aldehyde (C), the ethylene content of the EVOH, or the mass ratio of the EVOH (A) to the EVOH (B) did not fall within a predetermined range were inferior in flow mark inhibitory ability, coloring inhibitory ability and heat stretching properties.

Production of Multilayer Sheet

Example 16

Using equipment for forming a coextrusion cast film having seven layers of four types shown below, a coextrusion film formation test was carried out using the resin composition obtained above.

extruder (1): single screw, screw diameter=65 mm, L/D=22, for polyolefin of outer layer
extruder (2): single screw, screw diameter=40 mm, L/D=26, for polyolefin
extruder (3): single screw, screw diameter=40 mm, L/D=22, for adhesive resin
extruder (4): single screw, screw diameter=40 mm, L/D=26, for the resin composition described above Polypropylene (hereinafter, may be abbreviated as "PP" or "PP'") was fed to the extruder (1) and the extruder (2), respectively; a maleic anhydride-modified polypropylene adhesive resin (ADMER QF-500 (trade name), manufactured by Mitsui Chemicals, Inc.) was fed to the extruder (3); and the resin composition (a) obtained in Example 3 was fed to the extruder (4) to execute coextrusion film formation. The extrusion temperature setting was: 200° C. to 250° C. for the extruder (1); 200° C. to 250° C. for the extruder (2); 160° C. to 250° C. for the extruder (3); and 170° C. to 250° C. for the extruder (4), respectively, and the temperature setting of the feed block and the die was 250° C. With respect to the structure of the formed multilayer sheet and the thickness of each layer thereof, the subject structure having seven layers of four types, i.e., PP/PP'/adhesive resin/(a)/adhesive resin/PP'/PP=30/15/2.5/5/2.5/15/30 µm had a total thickness of 100 µm.

The sheet was sampled 10 hrs after starting the film formation, and the appearance was observed. Consequently, an unfavorable appearance resulting from the aggregation of EVOH, and flow marks resulting from abnormal flow were scarcely found. Accordingly, a practically applicable multilayer sheet was obtained.

Comparative Example 5

In a similar manner to Example 16 except that the resin composition used in Example 16 was replaced with the resin composition obtained in Comparative Example 1, the coextrusion film formation test was executed. The sheet was sampled 10 hrs after starting the film formation, and the appearance was observed. Consequently, a multilayer film having an unfavorable appearance resulting from the aggregation of EVOH, and a large number of flow marks resulting from abnormal flow was obtained.

Production of Container

Example 17

The resin composition obtained in Example 3, polyolefin (a), polyolefin (a') and carboxylic acid-modified polyolefin (b) were charged into separate extruders under the following conditions for extrusion molding, and a multilayer sheet having a total thickness of all layers of 1,000 µm and having seven layers of four types constituting a structure of (a)/(a')/(b)/resin composition/(b)/(a')/(a) (thickness of each layer: 200 µm/225 µm/25 µm/100 µm/25 µm/225 µm/200 µm) was obtained using a coextrusion sheet molding apparatus.

Each Extruder and Extrusion Conditions:
extruder for the polyolefin (a): single screw, screw diameter 65 mm, L/D=22, temperature 200° C. to 240° C.;
extruder for the resin composition obtained in Example 3: single screw, screw diameter 40 mm, L/D=26, temperature 170° C. to 210° C.;
extruder for the carboxylic acid-modified polyolefin (b): single screw, screw diameter 40 mm, L/D=26, temperature 160° C. to 220° C.; and
extruder for the polyolefin (a'): single screw, screw diameter 40 mm, L/D=22, temperature 160° C. to 210° C.

Molding Conditions of Coextrusion Sheet Molding Apparatus:
feed block die (width: 600 mm), temperature 240° C.

The obtained multilayer sheet was heated for 1.5 sec in Thermoformer (R530 manufactured by MULTIVAC) in which the temperature of a heater plate was adjusted to 100° C., whereby the temperature of the sheet was elevated to about 85° C. Thereafter, the sheet was placed in a die (giving a cuboid shape having a length of 130 mm, a width of 110 mm, and a depth of 50 mm; draw ratio S=0.45), and then compressed air (pressure of 5 kgf/cm$^2$ (0.5 MPa)) was blown thereinto to execute molding, whereby a container was obtained. The obtained container exhibited superior appearance characteristics and inhibited flow marks.

Example 18

The multilayer sheet obtained in Example 14 was subjected to heat molding (heat molding condition: compressed air pressure: 5 kgf/cm$^2$ (0.5 MPa); plug: 45φ×65 mm; syntax form, plug temperature: 150° C.; die temperature: 70° C.) into a cup shape (die shape: 70φ×70 mm; draw ratio S=1.0) using a thermoforming machine (manufactured by Asano Laboratories Co. Ltd.) at a temperature of 150° C. The obtained cup container exhibited superior appearance characteristics and inhibited flow marks. In addition, the cup container was cut according to the method described below and the cross section was observed. Consequently, the continuity of the resin composition layer was found.
Evaluations of Container Each container obtained was evaluated using the method described below. The results of the evaluations are shown in Table 2.
Continuity of Resin Composition Layer The cup container thus obtained was cut, then the cut section was observed using a microscope to evaluate continuity of the layer formed from the resin composition according to the embodiment of the present invention. Evaluation of "A (favorable)" was made in a case where the continuity of the resin composition layer was maintained, and evaluation of "B (unfavorable)" was made in a case where the continuity of the resin composition layer was lost.
Oxygen Transmission Rate The oxygen transmission rate was measured using an oxygen transmission rate test system ("MOCON OX-TRAN 2/20" manufactured by Modern Controls, Inc.). Specifically, the cup container was mounted on the test system, and the measurement was made at a temperature of 20° C. and a humidity of 65% RH (ASTM D3985). The oxygen barrier property was evaluated to be "A (favorable)" in a case where the measurement was less than 0.8 mL/(m$^2$·day·atm), and to be "B (unfavorable)" in a case where the measurement was 0.8 mL/(m$^2$·day·atm) or more.

Comparative Example 6

Using only the EVOH (A) pellets obtained in Example 1, a multilayer sheet was prepared in a similar manner to Example 16 from the resin composition pellets, and the multilayer sheet was molded into a cup container in a similar manner to Example 18. The cup container was cut and the cut section was observed. Consequently, the continuity of the resin composition layer was lost in a corner portion of the container. Moreover, the oxygen transmission rate of the container was remarkably increased, as compared with Example 18.

Comparative Example 7

Using only the EVOH (B) pellets obtained in Example 1, a multilayer sheet was prepared in a similar manner to Example 16 from the resin composition pellets, and the multilayer sheet was molded into a cup container in a similar manner to Example 18. The cup container was cut and the cut section was observed. Consequently, the continuity of the resin composition layer was lost in a corner portion of the container. Moreover, the oxygen transmission rate of the container was remarkably increased, as compared with Example 18.

Comparative Example 8

Using the EVOH (A) pellets obtained in Comparative Example 1, a multilayer sheet was prepared in a similar manner to Example 16 from the resin composition pellets, and the multilayer sheet was molded into a cup container in a similar manner to Example 18. The cup container was cut and the cut section was observed. Consequently, the continuity of the resin composition layer was lost in a corner portion of the container. Moreover, the oxygen transmission rate of the container was remarkably increased, as compared with Example 18.

Comparative Example 9

Using only the EVOH (B) pellets obtained in Comparative Example 1, a multilayer sheet was prepared in a similar manner to Example 16 from the resin composition pellets, and the multilayer sheet was molded into a cup container in a similar manner to Example 18. The cup container was cut and the cut section was observed. Consequently, the continuity of the resin composition layer was lost in a corner portion of the container. Moreover, the oxygen transmission rate of the container was remarkably increased, as compared with Example 18.

Comparative Example 10

The crotonaldehyde-containing EVOH (A) pellets obtained in Example 3 in an amount of 50% by mass and the crotonaldehyde-containing EVOH (B) pellets obtained in Example 3 in an amount of 50% by mass were mixed. After dry blending, the blended matter was subjected to extrusion and pelletization using a twin-screw extruder (2D25W, manufactured by Toyo Seiki Seisaku-sho, Ltd., 25 mmφ, die temperature of 220° C., and screw rotation speed of 100 rpm) under a nitrogen atmosphere, whereby composition pellets were obtained. A multilayer sheet was prepared in a similar manner to Example 16 from the resin composition pellets, and furthermore molded into a cup container in a similar manner to Example 18. The cup container was cut and the cut section was observed. Consequently, the continuity of the resin composition layer was found, but the oxygen barrier property of cup container was remarkably deteriorated as compared with Example 18.

Comparative Example 11

The EVOH (A) pellets obtained in Comparative Example 1 in an amount of 50% by mass and the EVOH (B) pellets in an amount of 50% by mass were mixed. After dry blending, the blended matter was subjected to extrusion and pelletization using a twin-screw extruder (2D25W, manufactured by Toyo Seiki Seisaku-sho, Ltd., 25 mmφ, die temperature of 220° C., and screw rotation speed of 100 rpm) under a nitrogen atmosphere, whereby composition pellets were obtained. A multilayer sheet was prepared in a similar manner to Example 16 from the resin composition pellets, and furthermore molded into a cup container in a similar manner to Example 18. The cup container was cut and the cut section was observed. Consequently, the continuity of the resin composition layer was found, but the oxygen barrier property of the cup container was remarkably deteriorated as compared with Example 18.

TABLE 2

|  | Continuity of resin composition layer | Oxygen barrier property |
|---|---|---|
| Example 18 | A | A |
| Comparative Example 6 | B | B |
| Comparative Example 7 | B | B |
| Comparative Example 8 | B | B |
| Comparative Example 9 | B | B |
| Comparative Example 10 | A | B |
| Comparative Example 11 | A | B |

INDUSTRIAL APPLICABILITY

The resin composition according to the present invention exhibits inhibited flow marks and coloring in a long-run operation, and is superior in heat stretching properties, and therefore the resin composition enables molded articles exhibiting superior appearance characteristics and inhibited flow marks to be molded. The multilayer sheet according to the present invention exhibits superior appearance characteristics and heat stretching properties. The packaging material according to the present invention exhibits superior appearance characteristics and inhibited flow marks. The container according to the present invention exhibits superior appearance characteristics and inhibited flow marks, and moreover in the container, the continuity of the resin composition layer is maintained, resulting in superior gas barrier properties. Therefore, the resin composition, the multilayer sheet, the packaging material and the container can be suitably used as a packaging material and the like superior in appearance characteristics, suitability for secondary processing, mechanical strength and the like.

The invention claimed is:

1. A molded article, comprising:
   (i) a barrier layer comprising a resin composition comprising:
      an ethylene-vinyl alcohol copolymer (A) having an ethylene content of 20 mol % or more and 50 mol % or less;
      an ethylene-vinyl alcohol copolymer (B) having an ethylene content of 30 mol % or more and 60 mol % or less; and
      an unsaturated aldehyde (C) and
   (ii) an additional layer laminated on at least one face of the barrier layer,
   wherein
      the ethylene content of the ethylene-vinyl alcohol copolymer (B) is at least 8 mol % more than the ethylene content of the ethylene-vinyl alcohol copolymer (A),
      a mass ratio (A/B) of the ethylene-vinyl alcohol copolymer (A) to the ethylene-vinyl alcohol copolymer (B) is 60/40 or more and 95/5 or less, and
      a content of the unsaturated aldehyde (C) with respect to a resin content is 0.01 ppm or more and less than 100 ppm.

2. The molded article according to claim 1, wherein a difference between a melting point of the ethylene-vinyl alcohol copolymer (A) and a melting point of the ethylene-vinyl alcohol copolymer (B) is 15° C. or more.

3. The molded article according to claim 1, wherein:
   the ethylene-vinyl alcohol copolymer (B) comprises a structural unit of formula (1),

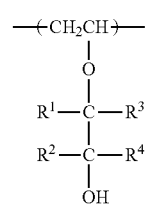

where, $R^1$, $R^2$, $R^3$ and $R^4$ each independently represent a hydrogen atom, a hydrocarbon group comprising 1 to 10 carbon atoms or an alkoxy group comprising 1 to 10 carbon atoms, wherein a part or all of hydrogen atoms in the hydrocarbon group are unsubstituted or optionally substituted with a hydroxyl group, an alkoxy group, a carboxyl group or a halogen atom, and $R^1$ and $R^2$ optionally represent a ring structure through binding with each other; and
   a percentage content of the structural unit with respect to a total vinyl alcohol units is 0.3 mol % or more and 40 mol % or less.

4. The molded article according to claim 1, wherein the unsaturated aldehyde (C) is an unsaturated aliphatic aldehyde.

5. The molded article according to claim 4, wherein the unsaturated aliphatic aldehyde is at least one selected from the group consisting of crotonaldehyde, 2,4-hexadienal and 2,4,6-octatrienal.

6. A multilayer sheet, comprising:
   (i) a barrier layer comprising a resin composition comprising:
      an ethylene-vinyl alcohol copolymer (A) having an ethylene content of 20 mol % or more and 50 mol % or less;
      an ethylene-vinyl alcohol copolymer (B) having an ethylene content of 30 mol % or more and 60 mol % or less; and
      an unsaturated aldehyde (C); and
   (ii) a thermoplastic resin layer laminated on at least one face of the barrier layer,
   wherein
      the ethylene content of the ethylene-vinyl alcohol copolymer (B) is at least 8 mol % more than the ethylene content of the ethylene-vinyl alcohol copolymer (A),
      a mass ratio (A/B) of the ethylene-vinyl alcohol copolymer (A) to the ethylene-vinyl alcohol copolymer (B) is 60/40 or more and 95/5 or less, and
      a content of the unsaturated aldehyde (C) with respect to a resin content is 0.01 ppm or more and less than 100 ppm.

7. The multilayer sheet according to claim 6, wherein the barrier layer and the thermoplastic resin layer are laminated using a coextrusion molding process.

8. A packaging material obtained by a process comprising: molding the multilayer sheet according to claim 6 using a heat-stretching process.

9. A container obtained by a process comprising: molding the multilayer sheet according to claim 6 using a vacuum-pressure forming process.

\* \* \* \* \*